United States Patent Office 3,164,439
Patented Jan. 5, 1965

3,164,439
PROCESS OF POLYISOCYANATE MODIFICATION OF POLYURETHANE ELASTOMERS
Cornelius Mühlhausen, Leverkusen, and Wilhelm Kallert, Cologne-Stammheim, Germany, assignors of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Mar. 1, 1957, Ser. No. 643,249
Claims priority, application Germany Mar. 23, 1956
6 Claims. (Cl. 8—115.5)

This invention relates generally to filaments formed from elastomeric plastics and, more particularly, to filaments formed from isocyanate-modified polyesters having improved tensile strength.

It has been proposed heretofore to manufacture filaments, films, coatings and the like of elastomeric plastics from solutions of the plastics. In such processes, the plastics are dissolved in a suitable solvent and the resulting solution is then either spread into a film for making coatings or films or it may be spun or extruded to form threads. A method for making solutions of elastomers of the polyester series is disclosed in U.S. Patent 2,755,266. In accordance with that process, a polyester is reacted with an organic polyisocyanate to form a compound having terminal —NCO groups and this product is then reacted with a chain-extender or cross-linking agent which may be water, a polyhydric alcohol or a diamine. The resulting product is then dissolved in a suitable solvent which may be any solvent that will dissolve a polyacrylonitrile. Small amounts of basic components, such as, for example, amines or alkalis, are included in the solvent to accelerate the dissolution of the plastic. It has been found that threads or films obtained from these solutions have approximately the same physical properties as those of the plastic before it was dissolved. It is preferred to form threads or films from a solution of the plastic instead of from the plastic per se because simpler processing steps can be utilized and plastics which would otherwise be scrap material can be used as the solute. Although the physical properties of the plastic remain the same as before it was dissolved, the tensile strength of the filaments has not always been sufficiently high to enable use of the filament for some purposes.

It is therefore an object of this invention to provide a method for improving the physical properties of filaments or films of isocyanate-modified elastomers. Another object of the invention is to provide a method for improving the tensile strength and elongation of threads, films, coatings, and similar filaments formed from a solution of an isocyanate-modified polyhydroxy compound which has been reacted with a chain-extender or cross-linking agent to form a rubber-like material. Still another object of the invention is to provide threads, films, coatings and other similar filaments having an isocyanate-modified polyhydroxy compound base and having improved elongation and tensile strength characteristics. A further object of the invention is to provide a method for improving the tensile strength of elastomeric plastics having a polyisocyanate base.

The foregoing objects as well as others are accomplished in accordance with this invention, generally speaking, by providing a process for treating finished filaments or films having a polyurethane plastic base with a solution of a polyisocyanate. The invention thus contemplates a process in which filaments or films are formed by any conventional process from a solution of an elastomeric plastic having an isocyanate base and the resulting filament is then treated with a solution of a polyisocyanate. The concentration of polyisocyanate in the solution may vary over a wide range, but it has been found particularly advantageous to use solutions of from about 0.1% to about 10% polyisocyanate, so solutions within this concentration range are preferred. The period of time required to bring about the improved tensile strength will vary with the size and other physical characteristics of the thread from a period of a few minutes to about one hour but seldom will more than one hour be required. It has been found advantageous to treat the filament with the solution at an elevated temperature of from about 100° C. to about 120° C.

Filaments or films formed from any elastomeric plastic having a polyisocyanate-modified base may be treated in accordance with the process of this invention to improve the tensile strength and elongation characteristics. The elastomeric plastic is a non-porous solid polyurethane which may be prepared, for example, from polyesters, polyesteramides, polyalkylene ether glycols, polythioether glycols or any other suitable polyhydroxy compound. These polyhydroxy compounds are reacted with any suitable polyisocyanate, such as, for example, hexamethylene diisocyanate, toluylene diisocyanate, p-phenylene diisocyanate, 4,4'-diphenylmethane diisocyanate, the so-called "hidden" isocyanates, such as the reaction product of a phenol and a diisocyanate, or the like. The polyesters may be prepared from any suitable dicarboxylic acid and polyhydroxy alcohol, such as, for example, ethylene glycol, diethylene glycol, or the like. The various dicarboxylic acids, isocyanates and polyesters disclosed in U.S. Patent 2,729,618 may be used for making the filaments. The resulting isocyanate-modified polyester, polyalkylene ether glycol, polyesteramide or polythioalkylene ether glycol is further reacted with a glycol, amine, amino alcohol or any other suitable cross-linking agent or chain-extender, such as those disclosed in the aforesaid patent. Examples of suitable polyalkylene ether glycols are disclosed in U.S. Patent 2,692,873. Any suitable polythioether, including those formed by the etherification of a thioether, such as, for example, thiodiglycol, with itself or other glycols may be utilized.

As pointed out in U.S. Patent 2,755,266, the solution of the elastomeric plastic may be prepared by dissolving the plastic in any suitable solvent. As a general rule, those solvents usually employed for a polyacrylonitrile are also suitable solvents for the isocyanate-modified plastic prepared from the polyhydroxy compounds and the polyisocyanate. The invention therefore contemplates using any such solvents, such as, for example, a hydrocarbon, ketone, ester or ether. Dimethyl formamide, dimethyl acetamide, dimethyl propionamide, methoxy dimethyl acetamide, acetoacetic ester, diethyl ether, benzene and chlorobenzene have been found to be particularly advantageous and are therefore preferred solvents. It is also possible to use a mixture of a solvent for the plastic with a non-solvent therefore which, while it will not dissolve the plastic, will cause the plastic to swell. Any substance capable of reacting with isocyanates, such as, for example, an alcohol, water, an amine or an alkali, may be used as the agent which accelerates the dissolution of the plastic in the solvent.

The coatings, impregnations, films or threads may be formed from the solutions by any conventional manner. The article to be impregnated may, for example, be submerged in a solution of the plastic until the plastic has become dispersed therein. The coating may be applied by brushing, spraying or dipping, while the film may be formed by forming a layer of the desired thickness of solution over an article to which the plastic, after evaporation of the solvent, will not adhere. The threads may be formed by any suitable spinning or extrusion methods.

It is preferred to treat the thread, film or other filament with a solution of the diisocyanate or other polyisocyanate while the temperature of the solution is at about the prevailing room temperature. Temperatures in the neighborhood of about 20° C. to 30° C. have been found particularly advantageous. Any suitable polyisocyanate may be used in this solution, such as, for example, hexamethylene diisocyanate, toluylene diisocyanate, p-phenylene diisocyanate, 4,4'-diphenylmethane diisocyanate, 4,4'-diphenyl dimethylmethane diisocyanate, 4,4',4''-triphenylmethane triisocyanate or the like, may be used. Furthermore, the reaction products of a polyhydric alcohol with an excess of a diisocyanate, such as, for example, the reaction product of 1 mol of trimethylol propane and 3 mols of toluylene diisocyanate may also be used as the solute in the treating solution.

Any suitable solvent for the polyisocyanate which solvent will not react with the isocyanate may be utilized in preparing this solution to be used for treating the filament such as, for example, acetone, methyl ethyl ketone, monomethyl glycol ether acetate, methylene chloride, chloroform, carbon tetrachloride, trichloroethylene, petrol ether, benzene, chlorobenzene, toluene, xylene, and the like.

It has already been proposed to improve the properties of threads and foils made from linear super polyamides by treating them with polyisocyanates. This treatment results in a diminished water absorption and increased stiffness of the treated polyamide. The reason for the improvement of polyamides by treating them with polyisocyanates is seen in the action of the NCO groups with the amido groups of the polyamide. It is surprising that filaments or films formed from elastomeric plastics having a polyisocyanate-modified base may be treated with a solution of polyisocyanates by which treatment the tensile strength and the elongation characteristic is improved. It was not to be expected that the treatment of polyurethanes results in an improvement of quite other mechanical properties than it is the case with regard to polyamides treated with polyisocyanates.

In order better to describe and further clarify the invention, the following are specific examples thereof.

EXAMPLE 1

About 126 grams of 1,5-naphthylene diisocyanate are incorporated by stirring at about 125° C. into about 1200 grams of a polyester obtained from ethylene glycol and adipic acid with an hydroxyl number of 55, the said polyester having been prepared by thermal esterification. After about 9 minutes, the temperature of the reaction mixture does not rise any further and about 10 grams of 1,4-butylene glycol are incorporated into the melt by stirring. The mixture is then poured into waxed molds heated to about 110° C. and further heated for about 24 hours at about 110° C.

About 300 grams of this plastic, cut into strips with an edge length of about 10 to 12 mm., are swollen in about 1200 cc. of dimethyl formamide containing about 0.1% of water. After swelling for about 8 hours at room temperature, a clear homogeneous solution can be produced by heating for about 30 minutes at about 95° C. This solution is spun from a capillary tube with an internal diameter of about 0.1 mm. into water at a temperature of about 30° C. After having remained in the water for from about 80 to about 90 seconds, the threads are no longer tacky and can be dried and wound at room temperature.

The threads obtained in the manner described show the properties set out in the following table under 1. By drying for about 3 hours at about 110° C. there are obtained threads with the properties indicated under No. 2. By washing with acetone, the properties of the threads are further improved (see under 3). The threads are substantially improved by being treated for about 1 hour in about a 1% solution of 1,5-naphthylene diisocyanate in acetone. The values under No. 4 are observed after simply drying the threads treated in this manner at room temperature, and the values given under No. 5 are observed after subsequent heating for about 3 hours at about 110° C.

Table I

| No. | Thickness, mm. | Tensile strength, kg./cm.² | Breaking elongation, percent |
| --- | --- | --- | --- |
| 1 | 0.10 | 525 | 580 |
| 2 | 0.10 | 576 | 580 |
| 3 | 0.09 | 590 | 640 |
| 4 | 0.09 | 1,260 | 720 |
| 5 | 0.09 | 1,490 | 760 |

EXAMPLE 2

About 700 grams of a polyester having an hydroxyl number of 58 and prepared by thermal esterification of about 1992 grams of ethylene glycol with about 4270 grams of adipic acid are stirred at about 125° C. with about 126 grams of 1,5-naphthylene diisocyanate. The temperature of the melt does not rise any higher after about 8 minutes. A mixture of about 5.6 grams of trimethylol propane and about 8.4 grams of 1,4-butylene glycol is then incorporated into the melt by stirring. The mass is thereafter poured into waxed molds and aftertreated for about 24 hours at about 110° C.

About 400 grams of the material obtained in this manner are cut into strips with an edge length of about 10 to 12 mm. and dissolved in about 2700 cc. of dioxane, to which about 8.2 grams of p-phenylene diamine are added, by heating for about 2 hours after being initially swollen for about 4 hours at room temperature. This solution is cast on a copper strip, and, after the dioxane has been evaporated by means of an air current at a temperature of about 50° C., a film about 0.05 mm. thick is obtained. After being kept for another 48 hours at approximately 30° C., this film shows a tensile strength of about 870 kg./cm.² and a breaking elongation of about 490%. After the film has been treated for about 30 minutes with a 1% solution of p-phenylene diisocyanate in chlorobenzene and thereafter heated for about 1 hour at about 110° C., the tensile strength is about 1320 kg./cm.² and the breaking elongation is about 640%. The film shows the same high resistance to oil and benzine and other solvents as the plastic had prior to being dissolved in dioxane.

EXAMPLE 3

About 500 grams of a polyether obtained from thiodiglycol and 1,4-butylene glycol in the molar ratio of 1:1 are stirred at about 126° C. with about 90 grams of 1,5-naphthylene diisocyanate. After about 7 minutes, the temperature of the melt does not rise any higher. After incorporation of about 10 grams of 1,4-butylene glycol into the melt by stirring, the mass is poured into molds, heated to about 110° C. and held at that temperature for about 24 hours.

About 200 grams of this plastic in the form of strips with an edge length of about 12 mm. are swollen for about 4 hours at room temperature in about 800 cc. of tetramethylene sulfone, with which had been admixed about 5.6 grams of isopropyl alcohol, and is thereafter dissolved by heating for about 1 hour at about 80° C.

This solution is spun from nozzles with an internal diameter of about 0.25 mm. into water at a temperature at about 35° C. After washing for about 25 minutes with water and drying by means of an air current at a temperature of about 25° C., threads are obtained which show the properties set out in the table under No. 1. By treatment with a cold 1% solution of 4,4'-diphenylmethane diisocyanate in diethyl ether and heating for about 1 hour at about 110° C., the mechanical values are even more substantially improved as shown in Table II opposite No. 2.

Table II

| No. | Thickness, mm. | Tensile strength, kg./cm.² | Breaking elongation, percent |
|---|---|---|---|
| 1 | 0.18 | 110 | 300 |
| 2 | 0.16 | 210 | 405 |
| 3 | 0.15 | 170 | 380 |

The threads show the same high resistance to saponifying influences as the previously prepared bulk plastic. For example, threads which have been treated with a 1% solution of 4,4'-diphenylmethyl diisocyanate in acetone at a temperature of about 110° C. for about 1 hour retain the improved tensile strength after having been stored for about 2 months in water at a temperature of about 60° C. No. 3 in the foregoing Table II illustrates the results obtained on a thread treated like No. 2 and then stored for about 2 months in water at about 60° C. It will be noted that the tensile strength was not materially affected.

Although the invention has been described in considerable detail for the purpose of clarification, it is to be understood that such detail is solely for this purpose and that variations can be made by those skilled in the art without departing from the spirit or scope of the invention except as set forth in the claims. Frequently, for convenience, the invention has been described with respect to a filament or film, but it is to be understood that the invention contemplates various types of sheet-like and thread-like structures including filaments, threads, films, coatings, impregnations and the like.

What is claimed is:

1. The method of improving the tensile strength and elongation of preformed polyurethane threads which comprises treating the preformed polyurethane thread with a solution containing an organic polyisocyanate.

2. The method of claim 1 wherein said polyurethane thread is treated with a solution containing an organic polyisocyanate at a temperature of from about 100° C. to about 120° C.

3. The method of claim 1 wherein said solution contains from about 0.1% to about 10% by weight of said organic polyisocyanate.

4. The method of claim 1 wherein said organic polyisocyanate is an aromatic polyisocyanate.

5. The method of claim 1 wherein said organic polyisocyanate is a toluylene diisocyanate.

6. In the preparation of a polyurethane plastic thread by a process which comprises dissolving an elastomeric polyurethane plastic in an inert organic solvent therefor and spinning the resulting solution to form a thread, the improvement which comprises treating the preformed thread with an inert organic solvent solution of an organic polyisocyanate by submerging said thread in said solution containing from about 0.1% to about 10% by weight of said organic polyisocyanate.

References Cited in the file of this patent

UNITED STATES PATENTS

| | | |
|---|---|---|
| 2,279,745 | Stevenson | Apr. 14, 1942 |
| 2,333,914 | Berchet | Nov. 9, 1943 |
| 2,454,678 | Smith | Nov. 23, 1948 |
| 2,503,209 | Nyquist | Apr. 4, 1950 |
| 2,625,535 | Mastin | Jan. 13, 1953 |
| 2,625,531 | Seeger | Jan. 13, 1953 |
| 2,729,618 | Muller | Jan. 3, 1956 |
| 2,923,598 | Reis | Feb. 2, 1960 |

FOREIGN PATENTS

| | | |
|---|---|---|
| 877,923 | France | Sept. 21, 1942 |
| 877,926 | France | Sept. 21, 1942 |
| 582,518 | Great Britain | Nov. 19, 1946 |
| 586,549 | Great Britain | Mar. 24, 1947 |